(12) United States Patent  (10) Patent No.: US 12,094,449 B2
Sugata  (45) Date of Patent: Sep. 17, 2024

(54) INFORMATION PROCESSING SYSTEM, INFORMATION PROCESSING METHOD, AND PROGRAM

(71) Applicant: TOYOTA JIDOSHA KABUSHIKI KAISHA, Toyota (JP)

(72) Inventor: Hikaru Sugata, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 394 days.

(21) Appl. No.: 17/526,389

(22) Filed: Nov. 15, 2021

(65) Prior Publication Data

US 2022/0157296 A1  May 19, 2022

(30) Foreign Application Priority Data

Nov. 17, 2020  (JP) ................................. 2020-191039

(51) Int. Cl.
*G10L 19/07*  (2013.01)
*G10L 15/02*  (2006.01)
*G10L 19/008*  (2013.01)
*G10L 19/032*  (2013.01)

(52) U.S. Cl.
CPC ............ *G10L 15/02* (2013.01); *G10L 19/008* (2013.01); *G10L 19/032* (2013.01); *G10L 19/07* (2013.01)

(58) Field of Classification Search
CPC ....... G10L 15/02; H04M 3/569; H04M 3/568; G06Q 50/01; G06Q 10/10; G01H 17/00
See application file for complete search history.

(56) References Cited

U.S. PATENT DOCUMENTS

| 5,801,756 A * | 9/1998 | Iizawa | H04N 7/152 370/266 |
| 2002/0052741 A1* | 5/2002 | Seo | G10L 15/20 704/E15.039 |
| 2004/0093210 A1* | 5/2004 | Toyama | G10L 15/20 704/E15.011 |
| 2005/0152563 A1* | 7/2005 | Amada | G10L 21/0208 381/94.1 |
| 2007/0050190 A1* | 3/2007 | Washio | G10L 15/22 704/E15.04 |

(Continued)

FOREIGN PATENT DOCUMENTS

| JP | 2006-208482 A | 8/2006 |
| JP | 2006-302047 A | 11/2006 |

(Continued)

*Primary Examiner* — Feng-Tzer Tzeng
(74) *Attorney, Agent, or Firm* — Dinsmore & Shohl LLP

(57) ABSTRACT

An information processing system which enables more appropriate analysis on a state of communication participated by a plurality of participants is provided. The information processing apparatus includes an utterance judgement unit and an analysis section determination section. The utterance judgement unit judges an utterance section which is a time-series section of an utterance of each of a plurality of participants in the communication. The analysis section determination unit uses a reference analysis section to set boundaries of a plurality of actual analysis sections so that time points of boundaries of the plurality of actual analysis sections become times corresponding to the non-utterance times.

6 Claims, 14 Drawing Sheets

(56) References Cited

U.S. PATENT DOCUMENTS

| | | | | |
|---|---|---|---|---|
| 2012/0189108 A1* | 7/2012 | Otani | .................. | H04M 1/6016 |
| | | | | 379/88.01 |
| 2016/0379118 A1* | 12/2016 | Ito | ........................ | G06Q 10/101 |
| | | | | 706/46 |
| 2020/0096351 A1* | 3/2020 | Sasagawa | ............. | G09B 29/106 |
| 2021/0082409 A1* | 3/2021 | Nakayama | ............. | G06Q 10/10 |

FOREIGN PATENT DOCUMENTS

| | | |
|---|---|---|
| JP | 2007-256498 A | 10/2007 |
| JP | 2016-046705 A | 4/2016 |
| WO | 2010/024426 A1 | 3/2010 |

* cited by examiner

INFORMATION PROCESSING SYSTEM, INFORMATION PROCESSING METHOD, AND PROGRAM

CROSS REFERENCE TO RELATED APPLICATIONS

This application is based upon and claims the benefit of priority from Japanese patent application No. 2020-191039, filed on Nov. 17, 2020, the disclosure of which is incorporated herein in its entirety by reference.

BACKGROUND

The present disclosure relates to an information processing system, an information processing method, and a program, and more particularly to an information processing system, an information processing method, and a program for performing processing related to communication.

There is a known technique for calculating a lively level of a communication place where a plurality of participants participate, such as a group work, a discussion, or a conference. In connection with this technique, Japanese Unexamined Patent Application Publication No. 2006-302047 discloses a conference support apparatus for supporting a remote conference held between a plurality of conference halls. A conference support apparatus according to Japanese Unexamined Patent Application Publication No. 2006-302047 recognizes a speech action in a conference based on operation information indicating an action of a participant in a conference hall, and calculates a conference hall degree of activity indicating the lively level of the conference hall based on the recognition result. The conference hall degree of activity is, for example, the amount of speech action per unit time in the conference hall.

SUMMARY

In certain communication, a state of the communication, such as the lively level or an atmosphere of the place, may change over time. In order to understand a transition of such a state of communication, the communication is divided into a plurality of sections at a certain time width, and an indicator of the communication is analyzed in each section of the time width along the transition of the time. In such an analysis, for example, an utterance length of each participant in each section is analyzed. Here, if the communication is divided at a time width in the middle of an utterance of one of the participants of the communication, the utterance length of the participant may not be appropriately acquired. Thus, an appropriate analysis on the state of the communication may not be possible.

The present disclosure provides an information processing system, an information processing method, and a program which enable more appropriate analysis on a state of communication participated by a plurality of participants.

An example aspect of the present disclosure is an information processing system including: an utterance judgement unit configured to judge an utterance section, the utterance section being a section on a time series of an utterance of each of a plurality of participants in communication, the plurality of participants participating in the communication; and an analysis section determination unit configured to set a boundary of a plurality of actual analysis sections using a reference analysis section of a predetermined time length so that a time point of the boundary of the plurality of actual analysis sections becomes a time corresponding to a non-utterance time, the actual analysis section being a time section for actually analyzing the communication, and the non-utterance time being a time not belonging to any of the utterance sections of the plurality of participants.

Another example aspect of the present disclosure is an information processing method including: judging an utterance section, the utterance section being a section on a time series of an utterance of each of a plurality of participants in communication, the plurality of participants participating in the communication; and setting a boundary of a plurality of actual analysis sections using a reference analysis section of a predetermined time length so that a time point of the boundary of the plurality of actual analysis sections becomes a time corresponding to a non-utterance time, the actual analysis section being a time section for actually analyzing the communication, and the non-utterance time being a time not belonging to any of the utterance sections of the plurality of participants.

Another example aspect of the present disclosure is a program for causing a computer to execute: judging an utterance section, the utterance section being a section on a time series of an utterance of each of a plurality of participants in communication, the plurality of participants participating in the communication; and setting a boundary of a plurality of actual analysis sections using a reference analysis section of a predetermined time length so that a time point of the boundary of the plurality of actual analysis sections becomes a time corresponding to a non-utterance time, the actual analysis section being a time section for actually analyzing the communication, and the non-utterance time being a time not belonging to any of the utterance sections of the plurality of participants.

With such a configuration of the present disclosure, it is possible to prevent the utterances of the participants from being divided by the actual analysis sections in the middle of the participants' utterances. Therefore, since the utterance length of the participant can be appropriately acquired in the actual analysis section, the state of the communication can be more appropriately analyzed.

Further, the analysis section determination unit may be configured to set, for the communication, a boundary of the reference analysis sections, and when the set boundary of the reference analysis section is included in at least one of the utterance sections of the plurality of participants, set a time point corresponding to the non-utterance time closest to the boundary of the reference analysis sections as a time point of the boundary of the actual analysis sections.

With such a configuration, the length of the actual analysis section can be closer to the length of the reference analysis section. Therefore, the variation in the length of the plurality of actual analysis sections can be prevented or minimized.

Further, the analysis section determination unit may be configured to set the boundaries of the plurality of the reference analysis sections in advance from a start time point to an end time point of the communication at intervals corresponding to the reference analysis sections, and set the boundaries of the plurality of reference analysis sections using the set boundaries of the plurality of reference analysis sections so that the time point of the boundary of the plurality of actual analysis sections becomes a time corresponding to the non-utterance time.

With such a configuration, the time points of the boundaries of the plurality of actual analysis sections can be collectively set, so that the processing can be simplified.

Furthermore, the analysis section determination unit may be configured to set the boundary of the reference analysis sections, and set the boundary of the actual analysis sections using the set boundary of the reference analysis sections so that the time point of the boundary of the actual analysis sections becomes the time corresponding to the non-utterance time, sequentially from a start time point of the communication.

With such a configuration, it is possible to prevent or minimize a difference between a length of the actual analysis section and a length of the reference analysis section.

In addition, the analysis section determination unit may be configured to execute a first step of setting the boundary of the reference analysis sections after a time corresponding to the reference analysis section from the start time point of the communication, execute a second step of setting the boundary of the actual analysis sections using the set boundary of the reference analysis sections so that the time point of the boundary of the actual analysis sections becomes the time corresponding to the non-utterance time; execute a third step of setting the boundary of the reference analysis sections after the time corresponding to the reference analysis section from the time point of the set boundary of the actual analysis section; and repeat the second step and the third step, so that the time points of the boundaries of the plurality of actual analysis sections are set.

With such a configuration, it is possible to more reliably set the boundaries of the plurality of actual analysis sections sequentially.

According to the present disclosure, it is possible to provide an information processing system, an information processing method, and a program which enable more appropriate analysis on a state of communication participated by a plurality of participants.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Embodiments of the present disclosure will be described below with reference to the drawings. In each of the drawings, the same elements are denoted by the same reference signs, and repeated description thereof is omitted as necessary.

Figure 1:
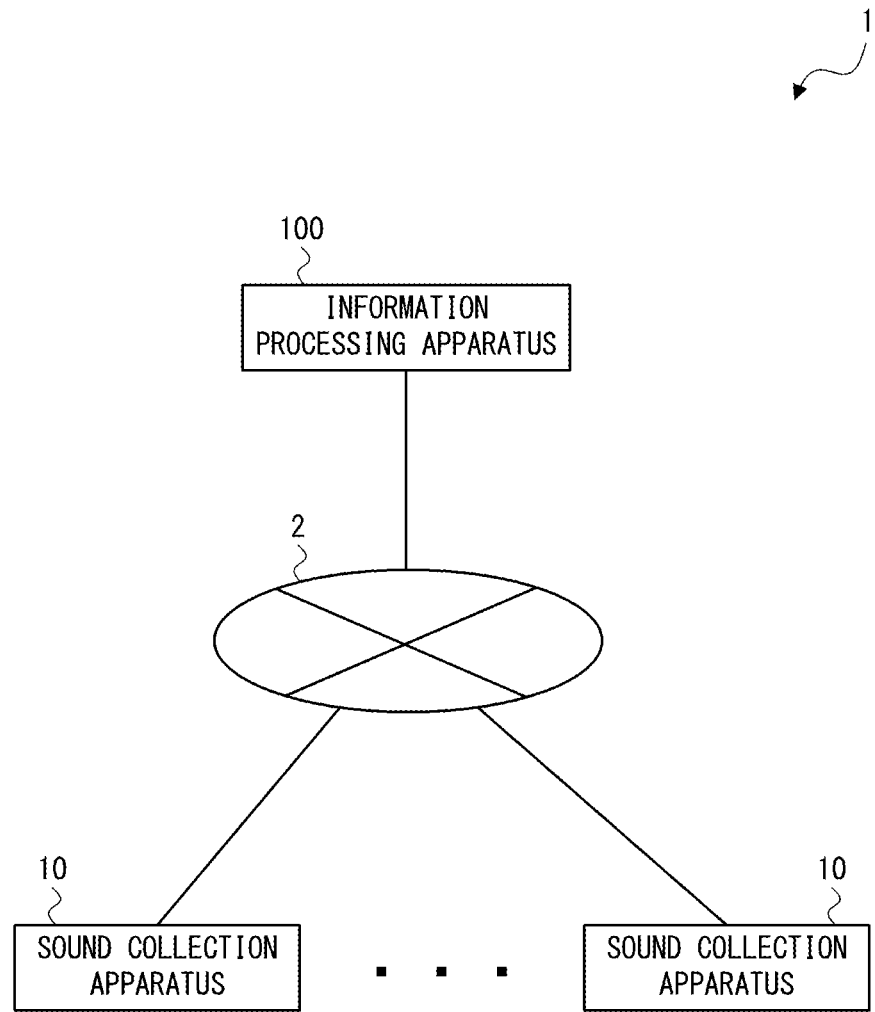
FIG. 1 shows an information processing system according to a first embodiment.

FIG. 1 is a diagram showing an information processing system 1 according to a first embodiment. The information processing system 1 according to this embodiment analyzes a state of communication in which a plurality of participants participate. Thus, the information processing system 1 functions as a communication analysis system (or simply an analysis system). Alternatively, the information processing system 1 functions as an analysis support system (or simply a support system) for supporting an analysis of the communication.

The term "communication" refers to, for example, group work, discussion, or conference, but is not limited to them. Further, when analyzing the communication, the information processing system 1 according to this embodiment divides the communication into a plurality of time-series sections, and analyzes an indicator of the communication for each divided section. This makes it possible to analyze the temporal transition of the state of the communication.

The information processing system 1 according to the first embodiment includes a plurality of sound collection apparatuses 10 and an information processing apparatus 100. The sound collection apparatuses 10 and the information processing apparatus 100 can be connected through a wired or wireless network 2.

The sound collection apparatus 10 includes a microphone. The sound collection apparatus 10 functions as a sensor for detecting voices. The sound collection apparatus 10 is configured to collect utterances of each participant. The sound collection apparatus 10 may be attached to each of the participants in the communication. For example, the sound collection apparatus 10 may be formed as a badge and attached to the participant. Alternatively, the sound collection apparatus 10 may be formed so that it can be hung around the participant's neck. Further alternatively, the sound collection apparatus 10 may be attached to the participant's head. The participant to which the sound collection apparatus 10 is attached utters in the communication. The sound collection apparatus 10 collects the utterances of the participants to which the sound collection apparatus 10 is attached. In this way, the sound collection apparatus 10 acquires utterance data (voice data) indicating the utterances of each participant. Hereinafter, the term "utterance" may also indicate the utterance data indicating the utterance.

The sound collection apparatus 10 may also detect a change in a sound pressure of the participant's utterance (voice). In this case, the sound collection apparatus 10 detects time-series data of the sound pressure of the utterance of the corresponding participant as the utterance data.

That is, the sound collection apparatus 10 acquires the utterance data (sound pressure data) for each participant.

Here, the information processing system 1 according to this embodiment does not need to understand contents of the utterances of the participants when analyzing the state of the communication. Therefore, it is not necessary for the sound collection apparatus 10 to collect utterances with sufficient accuracy to understand the contents of the utterance. For example, by sufficiently lowering a sampling rate at which the sound collection apparatus 10 collects the utterances (e.g., to about 20 Hz), it is possible to understand at what timing the participant utters without understanding the content of the utterance. By doing so, the psychological resistance of the participant can be reduced or minimized.

The information processing apparatus 100 acquires the utterance (the utterance data) of each participant from each of the plurality of sound collection apparatuses 10. The information processing apparatus 100 sets a plurality of analysis sections (actual analysis sections) on a time series (on a time axis) for actually analyzing the communication based on the timing at which each participant has uttered. At this time, the information processing apparatus 100 sets the actual analysis section so that boundaries of the actual analysis sections are not in the middle of the utterances of the participants. Here, the actual analysis section is a time section serving as a unit of the communication when the communication is actually analyzed.

Then, the information processing apparatus 100 analyzes the utterances of the plurality of participants for each of the plurality of set actual analysis sections using the utterances of each participant. This prevents the utterances of the participants from being divided by the actual analysis sections in the middle of the participants' utterances. Therefore, since the utterance length of the participant can be appropriately acquired in the actual analysis section, the state of the communication can be more appropriately analyzed. Details will be described later. The information processing apparatus 100 can function as an analyzing apparatus for analyzing the transition of the communication and the utterances in the communication. Alternatively, the information processing apparatus 100 functions as an analysis support apparatus (or simply a support apparatus) for supporting analysis of communication.

Figure 2:
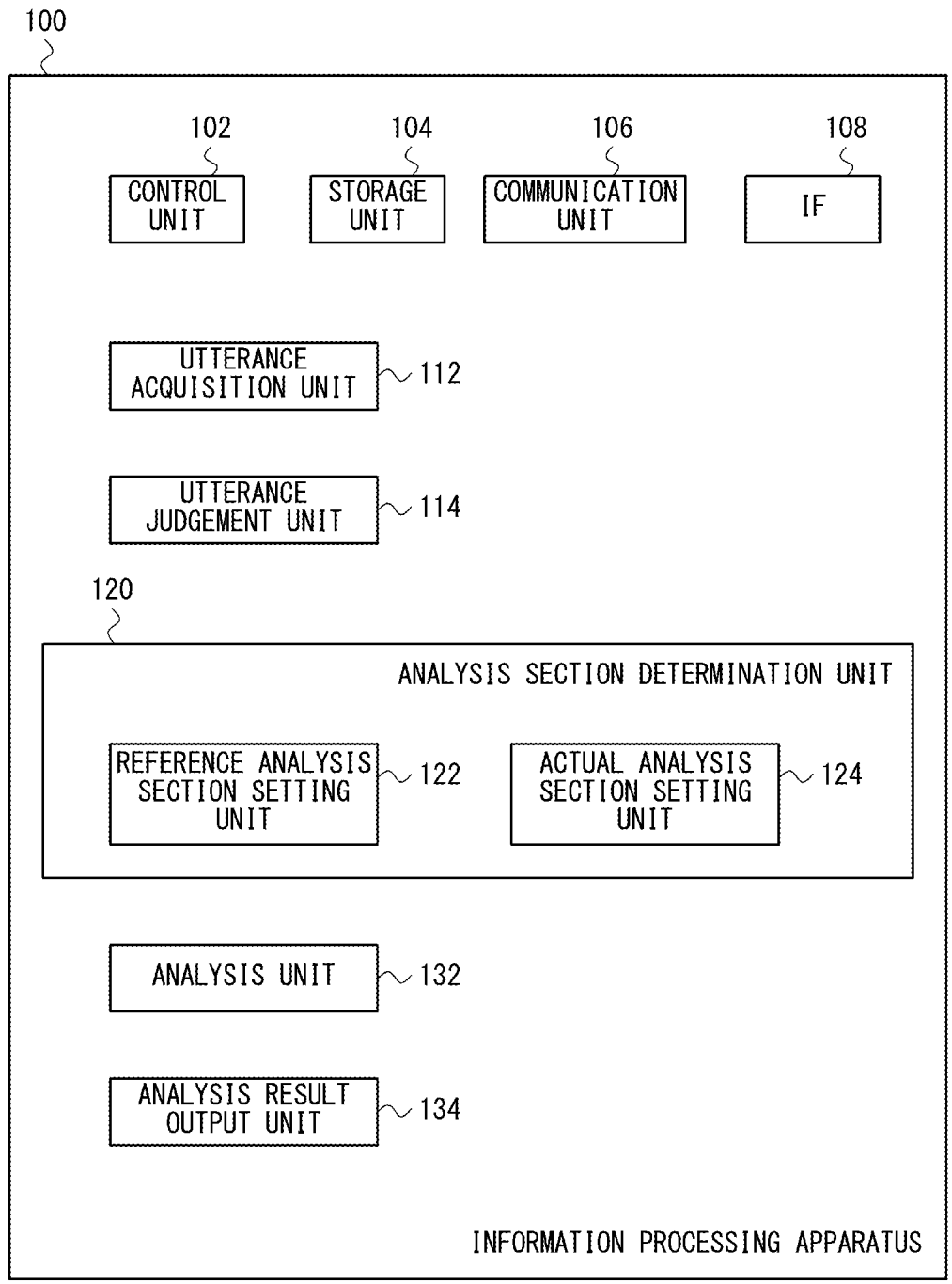
FIG. 2 shows a configuration of an information processing apparatus according to the first embodiment.

FIG. 2 shows a configuration of the information processing apparatus 100 according to the first embodiment. The information processing apparatus 100 includes a control unit 102, a storage unit 104, a communication unit 106, and an Interface (IF) unit 108. The control unit 102, the storage unit 104, the communication unit 106, and the interface unit 108 are connected to each other via a data bus or the like.

The control unit 102 is, for example, a processor such as a CPU (Central Processing Unit). The control unit 102 functions as an arithmetic unit for performing control processing, arithmetic processing, and the like. The storage unit 104 is, for example, a storage device such as a memory or a hard disk. The storage unit 104 is, for example, a ROM (Read Only Memory) or a RAM (Random Access Memory). The storage unit 104 has a function for storing a control program, an arithmetic program, and the like executed by the control unit 102. The storage unit 104 has a function for temporarily storing processing data and the like. The storage unit 104 may include a database.

The communication unit 106 performs processing necessary for communicating with other apparatuses such as the sound collection apparatuses 10 via the network 2. The communication unit 106 may include a communication port, a router, a firewall, etc. The interface (IF) unit 108 is, for example, a user interface (UI). The interface unit 108 includes an input apparatus such as a keyboard, a touch panel, or a mouse, and an output apparatus such as a display or a speaker. The interface unit 108 accepts an operation of input of data by a user (an operator) and outputs information to the user.

The information processing apparatus 100 includes, as components, an utterance acquisition unit 112, an utterance judgement unit 114, an analysis section determination unit 120, an analysis unit 132, and an analysis result output unit 134. The analysis section determination unit 120 includes a reference analysis section setting unit 122 and an actual analysis section setting unit 124. The utterance acquisition unit 112, the utterance judgement unit 114, the analysis unit determination unit 120, the analysis unit 132, and the analysis result output unit 134 have functions as utterance acquisition device, utterance judgement device, analysis section determination device, analysis device, and analysis result output device, respectively. The reference analysis section setting unit 122 and the actual analysis section setting unit 124 function as reference analysis section setting device and actual analysis section setting device, respectively.

Each component can be implemented by executing a program, for example, under control of the control unit 102. More specifically, each component can be implemented by the control unit 102 executing the program stored in the storage unit 104. In addition, necessary programs may be recorded on a predetermined recording medium and installed as necessary to implement the respective components. Further, the respective components may be implemented by any combination of hardware, firmware, and software or the like, instead of being implemented by software by programs. Each component may also be implemented using a user-programmable integrated circuit such as an FPGA (field-programmable gate array) or microcomputer. In this case, the integrated circuit may be used to implement the program including the above-described components. This also applies to the other embodiments described later.

The utterance acquisition unit 112 acquires the utterances (the utterance data) of the plurality of participants in the communication in which the plurality of participants participate. The utterance judgement unit 114 judges an utterance section which is a time-series section of an utterance of each of the plurality of participants in the communication. Specifically, the utterance judgement unit 114 judges the utterance section (utterance time) on the time series of each of the plurality of participants based on the utterance acquired by the utterance acquisition unit 112. That is, the utterance judgement unit 114 judges when each of the plurality of participants has uttered or not uttered in the communication to be analyzed. Then, the utterance judgement unit 114 generates an utterance transition graph showing the temporal transition of each utterance section of the plurality of participants from the start to the end of the communication. The utterance transition graph will be described later with reference to FIG. 5. The method by which the utterance judgement unit 114 judges the utterance section of each participant will be described later.

The analysis section determination unit 120 sets time points of the boundaries of the plurality of actual analysis sections according to the boundaries of a plurality of reference analysis sections and non-utterance times. In other words, the analysis section determination unit 120 uses the reference analysis section to set the boundaries of the plurality of actual analysis sections so that the time points of the boundaries of the plurality of actual analysis sections become the times corresponding to the non-utterance times. The analysis section determination unit 120 may set the boundaries of the reference analysis sections for the communication to be analyzed. When the boundary of the set reference analysis sections is included in at least one of the utterance sections of the plurality of participants, the analysis section determination unit 120 sets a time point included in the non-utterance time closest to the boundary of the reference analysis sections as the time point of the boundary of the actual analysis sections. Details will be described later.

Here, the reference analysis section is a time section having a predetermined time length. It is also assumed that the lengths of the plurality of reference analysis sections are the same. For example, the length of the reference analysis section is 10 minutes, but is not limited to this. The length of the reference analysis section may be appropriately determined by an analysis method. For example, even when the transition of the state of certain communication is analyzed, the reference analysis section may be set to 10 minutes when the analysis is performed by a certain analysis method, and the reference analysis section may be set to 5 minutes when the analysis is performed by another analysis method.

The non-utterance time is a time (a period) when no one of the plurality of participants is uttering. That is, the non-utterance time is a time not belonging to any utterance section of the plurality of participants. The non-utterance time may be referred to as a non-utterance period or non-utterance section. As described above, the actual analysis section is an analysis section in which the communication is actually analyzed. When the communication is actually analyzed, the utterances of the plurality of participants are analyzed for each actual analysis section. In this embodiment, in a certain analysis, the reference analysis section is constant, but the actual analysis section is not necessarily constant.

Here, the reference analysis section is a reference time section in which the utterance of each participant is analyzed when analyzing the transition of the state of communication. As described above, in the analysis of the transition of the state of communication, the utterance of each participant is analyzed for each time section. In this case, if the variation in the lengths of the time sections is large, an appropriate analysis may not be performed. For example, when an analysis is performed on communication by a certain analysis method, if the analysis is performed on a time section of 10 minutes in one period of time and another analysis is performed on a time section of 5 minutes in another time period of time, the analysis of the transition of the state of the communication may not be properly performed. Therefore, in this embodiment, the reference analysis section is provided in order to prevent or minimize the variation in the time sections for performing the analysis. Then, the analysis section determination unit 120 sets the actual analysis section in such a way that the length of the actual analysis section becomes as close as possible to the length of the reference analysis section.

The reference analysis section setting unit 122 sets the length of the reference analysis section in advance. The reference analysis section setting unit 122 sets the reference analysis section (a boundary of the reference analysis sections) in the utterance transition graph corresponding to the communication to be analyzed. The actual analysis section setting unit 124 sets the plurality of actual analysis sections (the boundaries of the actual analysis sections) in the utterance transition graph corresponding to the communication to be analyzed. Details will be described later.

The analysis unit 132 analyzes the utterances of the plurality of participants for each of the plurality of actual analysis sections. Any method that can analyze the transition of communication can be considered as the analysis method. Specific examples of the analysis method will be described later. The analysis result output unit 134 outputs a result of the analysis performed by the analysis unit 132.

Figure 3:
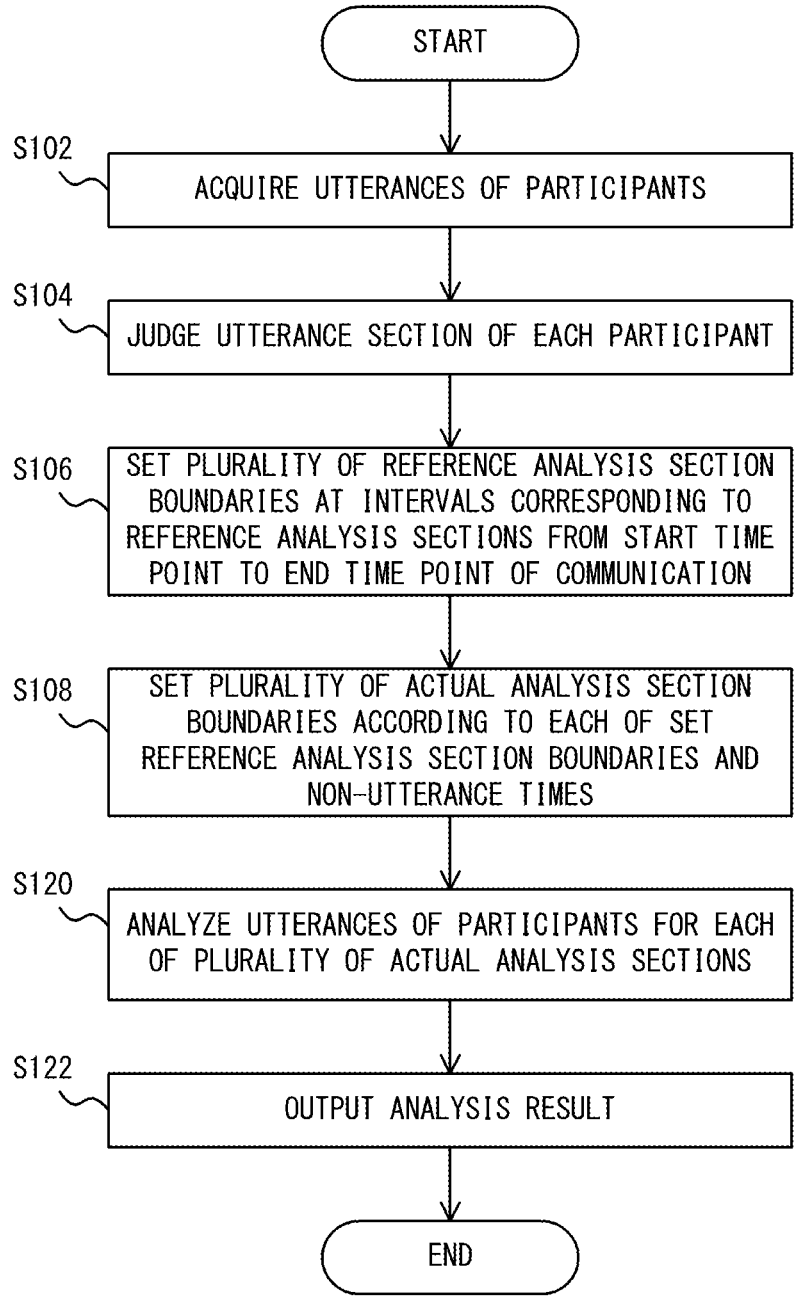
FIG. 3 is a flowchart showing an information processing method executed by the information processing system according to the first embodiment.

FIG. 3 is a flowchart showing an information processing method executed by the information processing system 1 according to the first embodiment. The flowchart shown in FIG. 3 shows the analysis method (analysis support method or support method) executed by the information processing apparatus 100. In the following description, an example of analyzing the communication in which a participant A, a participant B, and a participant C participate will be described with reference to FIGS. 5 to 7, which will be described later, as appropriate.

The utterance acquisition unit 112 acquires utterances of each of the plurality of participants (Step S102). Specifically, the utterance acquisition unit 112 acquires utterance data indicating the utterances of the plurality of participants from the sound collection apparatuses 10. More specifically, the utterance acquisition unit 112 acquires, as the utterance data, sound pressure data indicating a transition of the sound pressure over time involved in the utterance for each participant. An example of the sound pressure data is shown in FIG. 4, which will be described later.

Next, the utterance judgement unit 114 judges the utterance section of each participant (Step S104). Thus, the utterance judgement unit 114 generates the utterance transition graph. Specifically, the utterance judgement unit 114 judges a time section in which a sound pressure value is larger than a predetermined threshold in the sound pressure data of each participant as the utterance section of the participant.

Figure 4:
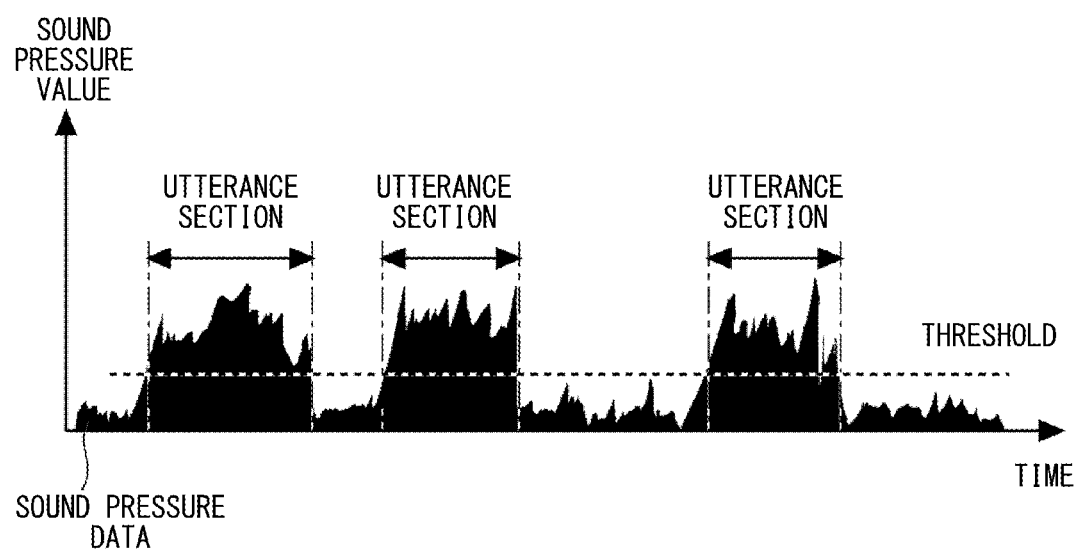
FIG. 4 is a diagram for explaining judgement processing of an utterance judgement unit according to the first embodiment.

FIG. 4 is a diagram for explaining the judgement processing of the utterance judgement unit 114 according to the first embodiment. FIG. 4 is a diagram for explaining a method of judging the utterance section using the sound pressure data of a certain participant (e.g., the participant A). The sound pressure data shows a temporal transition in the sound pressure. In the example of the sound pressure data shown in FIG. 4, the horizontal axis represents time and the vertical axis represents the sound pressure value. As shown in FIG. 4, the utterance judgement unit 114 judges the utterance section when the sound pressure value is greater than the threshold. In the example of FIG. 4, three utterance sections are judged for the participant A. The utterance judgement unit 114 judges the utterance section of each participant by performing the above processing for all participants.

Note that the utterance judgement unit 114 may judge the utterance section by determining noise in the voice data and not determining the section of the noise as the utterance section. At this time, when the utterance judgement unit 114 judges the utterance section of a certain participant (e.g., the participant A), it may judge noise using the sound pressure data of other participants (e.g., the participant B and participant C) who are close to the certain participant. In this case, the sound collection apparatus 10 may include a sensor for detecting position information for acquiring a distance between the participants. The sound pressure data may be associated with the position information.

Specifically, when judging the utterance section of the participant A, the utterance judgement unit 114 may compare a shape of the sound pressure data of the participant A with shapes of the sound pressure data of the participant B and the participant C, and judge sections having similar shapes as sections of noise. The noise referred to here is, for example, a disturbance (noisy sound) different from the utterance of any participant. There is also a case where the participant B is very close to the participant A and the utterance of the participant B is collected by the sound collection apparatus 10 of the participant A. In this case, the utterance judgement unit 114 may compare the shape of the sound pressure data of the participant A with the shape of the sound pressure data of the participant B, and judge that sections having similar shapes but lower than the sound pressure in the sound pressure data of the participant B are the utterance sections of the participant B, and may not judge that these sections are the utterance sections of the participant A. Thus, the noise referred to here may correspond to the utterance of another participant near the participant to be judged.

The utterance judgement unit 114 judges the utterance sections for all participants participating in the communication. Then, the utterance judgement unit 114 generates the utterance transition graph as shown in FIG. 5 by arranging the utterance sections of the plurality of participants on the same time series.

Figure 5:
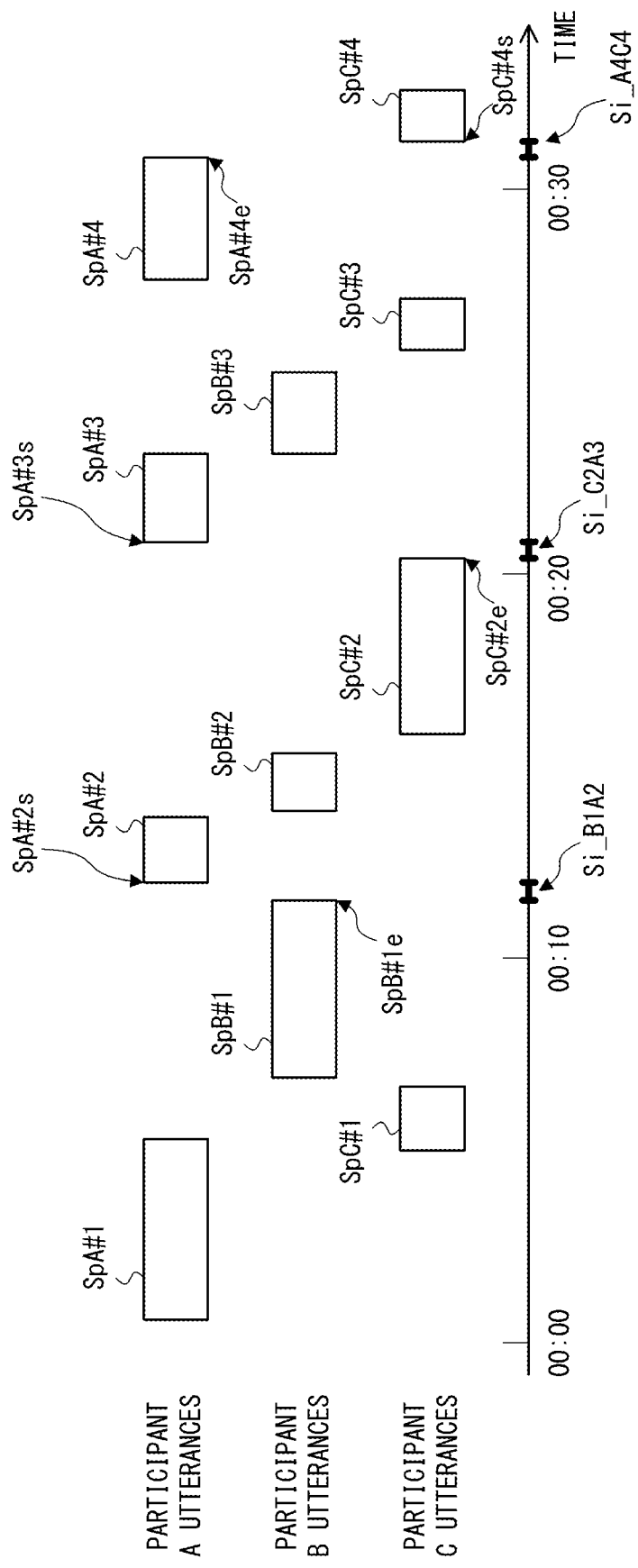
FIG. 5 shows an example of an utterance transition graph generated by the utterance judgement unit according to the first embodiment.

FIG. 5 shows an example of the utterance transition graph generated by the utterance judgement unit 114 according to the first embodiment. The horizontal axis of FIG. 5 represents time. "00: 00" represents a start time point of communication. "00: 10" indicates a time point 10 minutes after the start time point of the communication. The utterance transition graph shown in FIG. 5 includes the utterance sections of the participants A to C. The utterance sections of the participant A are utterance sections SpA #1, SpA #2, SpA #3, and SpA #4. The utterance sections of the participant B are utterance sections SpB #1, SpB #2, and SpB #3. The utterance sections of the participant C are utterance sections SpC #1, SpC #2, SpC #3, and SpC #4. The utterance transition graph shows when each participant has uttered and when each participant has not uttered.

In FIG. 5, the non-utterance time is a time when the utterance sections SpA #1 to SpA #4 of the participant A, the utterance sections SpB #1 to SpB #3 of the participant B, and the utterance sections SpC #1 to SpC #4 of the participant C do not overlap with each other. For example, the time between an end time point SpB #1e of the utterance section SpB #1 of the participant B and a start time point SpA #2s of the utterance section SpA #2 of the participant A is a non-utterance time Si_B1A2. The time between an end time point SpC #2e of the utterance section SpC #2 of the participant C and a start time point SpA #3s of the utterance section SpA #3 of the participant A is a non-utterance time Si_C2A3. The time between an end time point SpA #4e of the utterance section SpA #4 of the participant A and a start time point SpC #4s of the utterance section SpC #4 of the participant C is a non-utterance time Si_A4C4.

Returning to the description of the flowchart of FIG. 3. The analysis section determination unit 120 sets the boundaries (the reference analysis section boundaries) of the plurality of reference analysis sections in advance at intervals corresponding to the reference analysis sections, from the start time point to the end time point of the communication (Step S106). More specifically, the reference analysis section setting unit 122 collectively arranges the plurality of reference analysis section boundaries in the utterance transition graph at intervals corresponding to the reference analysis sections, from the start time point to the end time point of the communication. By doing so, the plurality of reference analysis section boundaries are arranged at equal intervals in the utterance transition graph. That is, in the utterance transition graph, the plurality of reference analysis sections of the same length are arranged in such a way that they are connected to each other on the time axis. Note that the reference analysis section boundary corresponds to the end time point of the reference analysis section. In the first embodiment, the reference analysis section boundary is a time point corresponding to the boundary between one reference analysis section and the next reference analysis section.

Figure 6:
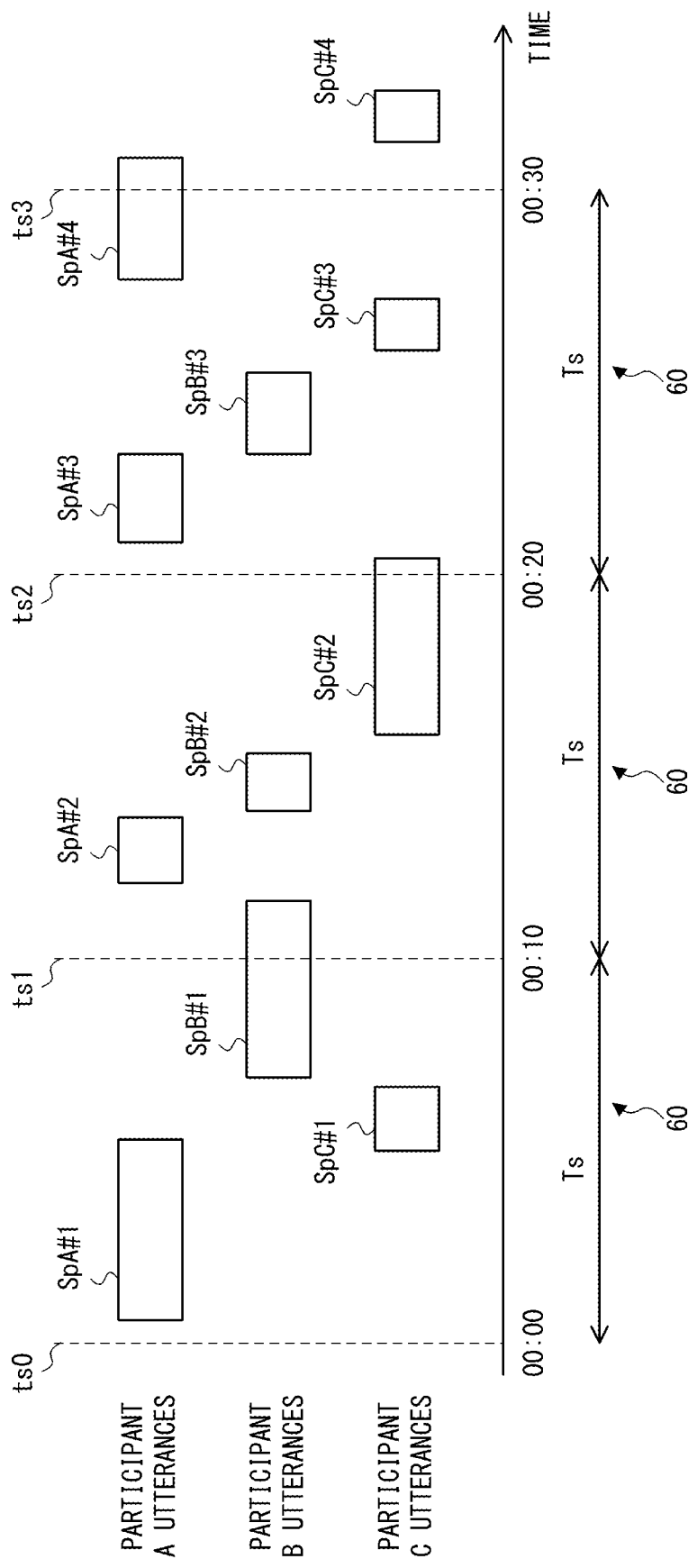
FIG. 6 shows an example of a state in which reference analysis section boundaries are disposed in the utterance transition graph by a reference analysis section setting unit according to the first embodiment.

FIG. 6 is a diagram showing an example of a state in which the reference analysis section boundaries are arranged in the utterance transition graph by the reference analysis section setting unit 122 according to the first embodiment. Here, the time length of a reference analysis section 60 is defined as Ts (minutes). For example, Ts=10 (minutes), but the present disclosure is not limited to this. In the first embodiment, the reference analysis section boundaries are arranged every Ts from a start time point ts0 of the communication to an end time point of the communication. In FIG. 6, for example, a first reference analysis section boundary ts1 is disposed at a time point Ts minutes from the communication start time point ts0. A second reference analysis section boundary ts2 is disposed at a time point Ts minutes from the reference analysis section boundary ts1. A third reference analysis section boundary ts3 is disposed at a time point Ts minutes from the reference analysis section boundary ts2. Note that, if the time between a certain reference analysis section boundary tsX (not shown) and the end time point of the communication becomes less than Ts in the vicinity of the end time point of the communication, the reference analysis section boundary is not disposed between the reference analysis section boundary tsX and the end time point of the communication.

Returning to the description of the flowchart of FIG. 3. The analysis section determination unit 120 sets the boundaries (the actual analysis section boundaries) of the plurality of actual analysis sections according to each of the set reference analysis section boundaries and the non-utterance times (Step S108). Specifically, the actual analysis section setting unit 124 sets the plurality of actual analysis section boundaries (the actual analysis sections) using the plurality of set reference analysis section boundaries so that the time points of the plurality of actual analysis section boundaries correspond to the non-utterance times. More specifically, for each of the plurality of reference analysis section boundaries, when the time point of the reference analysis section boundary is included in at least one of the utterance sections, the actual analysis section setting unit 124 sets the time corresponding to the non-utterance time closest to the reference analysis section boundary as the time point of the actual analysis section boundary. When the time point of the reference analysis section boundary is included in the non-utterance time, the actual analysis section setting unit 124 sets the time point of the reference analysis section boundary as the time point of the actual analysis section boundary. Note that the actual analysis section boundary corresponds to the end time point of the corresponding actual analysis section. In other words, the actual analysis section boundary is the time point corresponding to the boundary between the corresponding actual analysis section and the next actual analysis section.

Figure 7:
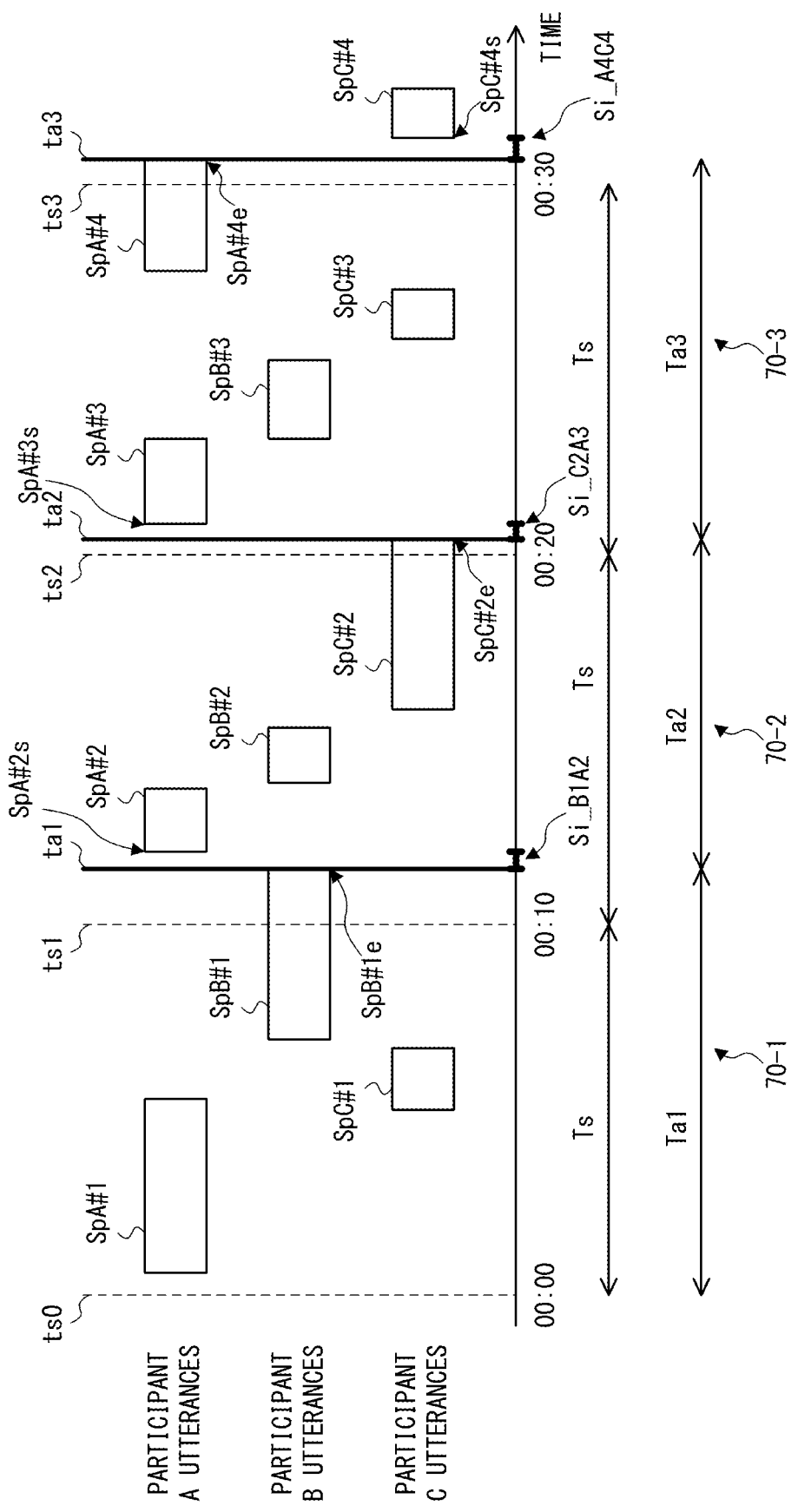
FIG. 7 is a diagram for explaining a method of setting actual analysis section boundaries by an actual analysis section setting unit according to the first embodiment.

FIG. 7 is a diagram for explaining a method of setting the actual analysis section boundaries by the actual analysis section setting unit 124 according to the first embodiment.

FIG. 7 corresponds to the case in which the reference analysis section boundaries are arranged in the utterance transition graph as shown in FIG. 6. In the utterance transition graph in which the reference analysis section boundaries are arranged, when the reference analysis section boundary is included in an utterance section of any participant, the actual analysis section setting unit 124 sets a time point corresponding to the non-utterance time closest to the reference analysis section boundary as the time point of the actual analysis section boundary.

In FIG. 7, the first reference analysis section boundary ts1 is included in the utterance section SpB #1. In this case, the actual analysis section setting unit 124 sets the time point included in the non-utterance time Si_B1A2, which is the non-utterance time closest to the reference analysis section boundary ts1, as a time point of a first actual analysis section boundary ta1 corresponding to a first actual analysis section 70-1. In the example of FIG. 7, the actual analysis section setting unit 124 sets the time point corresponding to the end time point SpB #1e of the utterance section SpB #1, which is closest to the reference analysis section boundary ts1 in the non-utterance time Si_B1A2, as the time point of the actual analysis section boundary ta1. In this manner, the actual analysis section setting unit 124 sets the actual analysis section 70-1 having a time length Ta1 (minutes), from the communication start time point ts0 to the actual analysis section boundary ta1.

Further, the second reference analysis section boundary ts2 is included in the utterance section SpC #2. In this case, the actual analysis section setting unit 124 sets the time point included in the non-utterance time Si_C2A3, which is the non-utterance time closest to the reference analysis section boundary ts2, as a time point of a second actual analysis section boundary ta2 corresponding to a second actual analysis section 70-2. In the example of FIG. 7, the actual analysis section setting unit 124 sets the time point corresponding to the end time point SpC #2e of the utterance section SpC #2, which is closest to the reference analysis section boundary ts2 in the non-utterance time Si_C2A3, as the time point of the actual analysis section boundary ta2. In this manner, the actual analysis section setting unit 124 sets the actual analysis section 70-2 having a time length Ta2 (minutes), from the actual analysis section boundary ta1 to the actual analysis section boundary ta2.

The third reference analysis section boundary ts3 is included in the utterance section SpA #4. In this case, the actual analysis section setting unit 124 sets the time point included in the non-utterance time Si_A4C4, which is the non-utterance time closest to the reference analysis section boundary ts3, as a time point of a third actual analysis section boundary ta3 corresponding to a third actual analysis section 70-3. In the example of FIG. 7, the actual analysis section setting unit 124 sets the end time point SpA #4e of the utterance section SpA #4, which is closest to the reference analysis section boundary ts3 at the non-utterance time Si_A4C4, as the time point of the actual analysis section boundary ta3. In this manner, the actual analysis section setting unit 124 sets the actual analysis section 70-3 having a time length Ta3 (minutes), from the actual analysis section boundary ta2 to the actual analysis section boundary ta3.

In this way, the actual analysis section 70-1 includes the utterance section SpA #1, the utterance section SpC #1, and the utterance section SpB #1 without interruption. In addition, the actual analysis section 70-2 includes the utterance section SpA #2, the utterance section SpB #2, and the utterance section SpC #2 without interruption. The actual analysis section 70-3 includes the utterance section SpA #3, the utterance section SpB #3, the utterance section SpC #3, and the utterance section SpA #4 without interruption.

Returning to the description of the flowchart of FIG. 3. The analysis unit 132 analyzes the utterances of the plurality of participants for each of the plurality of actual analysis sections set in the processing of Step S108 (Step S120). The analysis result output unit 134 outputs the analysis result obtained in the processing of Step S120 (Step S122). For example, the analysis result output unit 134 may display the analysis result on the interface unit 108, which is a display.

A specific example of the analysis method performed by the analysis unit 132 will be described. For example, the analysis unit 132 acquires the length of each utterance section included in the actual analysis section. The analysis unit 132 calculates an average value of the lengths of the utterance sections (the utterance times) for each of the plurality of actual analysis sections. In the example of FIG. 7, the analysis unit 132 calculates, for example, the average value of the length of the utterance section SpA #1, the length of the utterance section SpC #1, and the length of the utterance section SpB #1 for the actual analysis section 70-1.

The analysis unit 132 evaluates the state of the communication using the average value of the lengths of the utterance sections. For example, the analysis unit 132 evaluates that the larger the average value of the length of the utterance sections is, the more in-depth the discussion is made in the actual analysis section. On the other hand, the analysis unit 132 evaluates that the smaller the average value of the lengths of the utterance sections, the faster the opinions are exchanged in the actual analysis section. The analysis unit 132 can judge the transition of the state of the communication from the analysis results in the plurality of actual analysis sections.

A weight of an amount of change in the length of the utterance section (the utterance time) may vary depending on the length of the utterance section, even if the amount of change is the same. For example, when a change of 1 second in an utterance section having a short utterance time (e.g., 5 seconds) is compared with a change of 1 second in an utterance section having a long utterance time (e.g., 50 seconds), the weight of the change of 1 second in the utterance section having a short utterance time is larger. Therefore, by converting the utterance time in logarithm, the weight of the amount of change in the long utterance time can be reduced. Specifically, assuming that an utterance time in an utterance section i is $T_i$, the analysis unit 132 calculates $X_i = \log_{10}(T_i + 1)$. Next, the analysis unit 132 calculates an average value of $X_i$ for each of the plurality of actual analysis sections. Then, the analysis unit 132 evaluates the state of the communication using the calculated average value of $X_i$ as described above. The base of the logarithm of $X_i$ does not have to be 10, and instead may be any value.

The analysis unit 132 may calculate an utterance rate for each of the plurality of actual analysis sections. The utterance rate is a ratio of a total time $Tb\_k$ of the time when any of the participants is uttering in the actual analysis sections to a time length $Ta\_k$ of a corresponding actual analysis section k. Note that $Tb\_k = Ta\_k - Tc\_k$, where $Tc\_k$ is the total time of the non-utterance time in the actual analysis section k. The analysis unit 132 may evaluate the state of the communication using the utterance rate. For example, the analysis unit 132 may evaluate that the larger the utterance rate is, the more lively the discussion becomes in the actual analysis section.

The analysis unit 132 may calculate the number of utterances in each of the plurality of actual analysis sections. In the example of FIG. 7, the analysis unit 132 calculates the number of utterances as three for the actual analysis section 70-1, calculates the number of utterances as three for the actual analysis section 70-2, and calculates the number of utterances as four for the actual analysis section 70-3. The analysis unit 132 may evaluate the state of the communication using the number of utterances. For example, the analysis unit 132 may evaluate that the larger the number of utterances is, the faster the discussions are made in the actual analysis section.

As described above, the information processing apparatus 100 according to the first embodiment is configured to set the boundaries of the plurality of actual analysis sections so that the time points of the boundaries of the plurality of actual analysis sections become the times corresponding to the non-utterance times using the reference analysis section having the predetermined time length. This prevents the utterances of the participants from being divided by the actual analysis sections in the middle of the participants' utterances. Therefore, since the utterance length of the participant can be appropriately acquired in the actual analysis section, the state of the communication can be more appropriately analyzed.

As described above, the information processing apparatus 100 according to the first embodiment sets the boundaries of the reference analysis sections for the communication to be analyzed. When the boundary of the set reference analysis sections is included in at least one of the utterance sections of the plurality of participants, the information processing apparatus 100 sets the time point included in the non-utterance time closest to the boundary of the reference analysis sections as the time point of the boundary of the actual analysis sections. This makes the length of the actual analysis section closer to the length of the reference analysis section. For example, if the length of the reference analysis section is 10 minutes, the length of each actual analysis section can be made close to 10 minutes. Therefore, the variation in the length of the plurality of actual analysis sections can be prevented or minimized.

Further, the information processing apparatus 100 according to the first embodiment sets the boundaries of the plurality of reference analysis sections at intervals corresponding to the reference analysis sections from the start time point to the end time point of the communication in advance. Then, the information processing apparatus 100 sets the boundaries of the plurality of actual analysis sections so that the time points of the boundaries of the plurality of actual analysis sections becomes the times corresponding to the non-utterance times using the respective boundaries of the plurality of set reference analysis sections. With such a configuration, the time points of the boundaries of the plurality of actual analysis sections can be collectively set, so that the processing can be simplified.

In the example of FIG. 7, the actual analysis section boundary is set at the start time point or the end time point of the non-utterance time (i.e., the end time point or the start time point of a certain utterance section), but the present disclosure is not limited to this. The actual analysis section boundary may be any time point in the non-utterance time. For example, the actual analysis section boundary may be set at a time point included in the non-utterance time when the length of the corresponding actual analysis section becomes the closest to the length of the reference analysis section. Thus, the length of the actual analysis section to be set becomes closer to the length of the reference analysis section. Therefore, the variation in the length of the actual analysis section can be further reduced. This also applies to the second embodiment described later.

Second Embodiment

Next, a second embodiment will be described. In the second embodiment, the method of setting the boundary of the actual analysis sections is different from that according to the first embodiment. A hardware configuration of an information processing system 1 according to the second embodiment is substantially the same as the hardware configuration of the information processing system 1 according to the first embodiment shown in FIG. 1, and thus a description thereof will be omitted. A configuration of an information processing apparatus 100 according to the second embodiment is substantially the same as that shown in FIG. 2, and thus a description thereof is omitted.

The information processing apparatus 100 (an analysis section determination unit 120) according to the second embodiment, from the start time point of the communication, sequentially sets the boundaries of the reference analysis sections, and sequentially sets the time points of the boundaries of the actual analysis sections according to the set boundaries of the reference analysis sections and the non-utterance time. That is, the analysis section determination unit 120 according to the second embodiment sets the boundaries of the reference analysis sections, and sets the boundaries of the actual analysis sections using the set boundaries of the reference analysis sections so that the time points of the boundaries of the actual analysis sections correspond to the non-utterance times, sequentially from the start time point of the communication.

Figure 8:
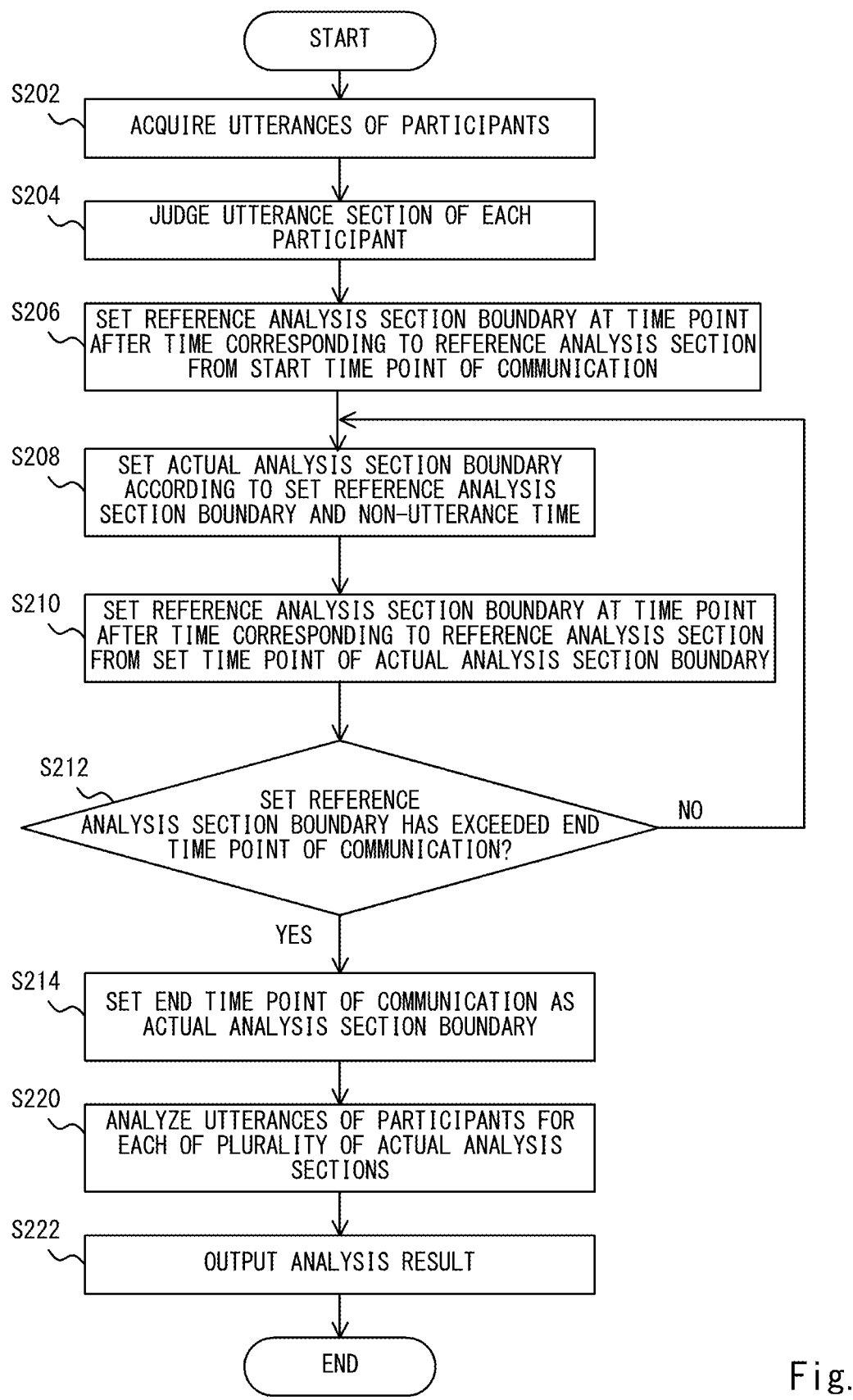
FIG. 8 is a flowchart showing an information processing method executed by an information processing system according to a second embodiment.

FIG. 8 is a flowchart showing an information processing method executed by the information processing system 1 according to the second embodiment. The flowchart shown in FIG. 8 shows an analysis method (analysis support method or support method) executed by the information processing apparatus 100. After the flowchart shown in FIG. 8 is described, a specific example using an utterance transition graph will be described with reference to FIGS. 9 to 14.

The utterance acquisition unit 112 acquires utterances of each of the plurality of participants in the same manner as the processing of Step S102 (Step S202). The utterance judgement unit 114 judges the utterance section of each participant in the same manner as the processing of Step S104 (Step S204). Thus, the utterance judgement unit 114 generates the utterance transition graph as shown in FIG. 5.

Next, the analysis section determination unit 120 sets the reference analysis section boundary at a time point after the time corresponding to the reference analysis section from the start time point of the communication (Step S206). This processing of Step S206 is referred to as a first step. Specifically, the reference analysis section setting unit 122 sets a time point of a first reference analysis section boundary at a time point after a time length Ts of the reference analysis section from the start time point of the communication. In this manner, the reference analysis section setting unit 122 executes the first step. The processing of Step S206 will be described later with reference to FIG. 9.

Next, the analysis section determination unit 120 sets the actual analysis section boundary according to the set reference analysis section boundary and the non-utterance time (Step S208). The processing of Step S208 is referred to as a second step. Specifically, the actual analysis section setting unit 124 uses the set boundary of the reference analysis sections to set the boundary of the actual analysis sections so that the time point of the boundary of the actual analysis sections become the time corresponding to the non-utterance time. More specifically, when the time point of the reference analysis section boundary is included in at least one of the utterance sections, the actual analysis section setting unit 124 sets the time corresponding to the non-utterance time closest to the reference analysis section boundary as the time point of the actual analysis section boundary. In other words, in the utterance transition graph in which the reference analysis section boundaries are arranged, when the reference analysis section boundary is included in the utterance section of any participant, the actual analysis section setting unit 124 sets the time point corresponding to the non-utterance time closest to the reference analysis section boundary as the time point of the actual analysis section boundary. In this manner, the actual analysis section setting unit 124 executes the second step.

Here, the analysis section determination unit 120 sets the nth actual analysis section boundary according to the set nth reference analysis section boundary and the non-utterance time. Note that "n" is an integer of 1 or more, and indicates an order from the start time point of the communication. When the time point of the reference analysis section boundary is included in the non-utterance time, the actual analysis section setting unit 124 sets the time point of the reference analysis section boundary as the time point of the actual analysis section boundary. The processing of Step S208 will be described later with reference to FIGS. 10, 12 and 14.

Next, the analysis section determination unit 120 sets the reference analysis section boundary at a time point after the time corresponding to the reference analysis section from the time point of the actual analysis section boundary set in the processing of Step S208 (Step S210). The processing of Step S210 is referred to as a third step. Specifically, the reference analysis section setting unit 122 sets the time point of the (n+1)th reference analysis section boundary at a time point after the time length Ts of the reference analysis section from the time point of the nth actual analysis section boundary corresponding to the nth actual analysis section. In this manner, the reference analysis section setting unit 122 executes the third step. The processing of Step S210 will be described later with reference to FIGS. 11 and 13.

Next, the analysis section determination unit 120 judges whether or not the time point corresponding to the reference analysis section boundary set in the processing of Step S210 has exceeded the end time point of the communication (Step S212). When the time point corresponding to the set reference analysis section boundary does not exceed the end time point of the communication (NO in S212), the processing returns to S208, because the setting of the boundaries of all the actual analysis sections has not been completed. Then, the analysis section determination unit 120 repeatedly executes the processing of Step S208 (the second step) and the processing of Step S210 (the third step) until the end time point of the communication, thereby setting the time points of the boundaries of the plurality of actual analysis sections.

On the other hand, when the time point corresponding to the set reference analysis section boundary exceeds the end time point of the communication (YES in Step S212), the analysis section determination unit 120 (actual analysis section setting unit 124) sets the end time point of the communication as the actual analysis section boundary (Step S214). Thus, the setting of the boundaries of all the actual analysis sections is completed. In a manner similar to the processing of S120, the analysis unit 132 analyzes the utterances of the plurality of participants for each of the plurality of actual analysis sections set in the processing of S210 executed a plurality of times (Step S220). The analysis result output unit 134 outputs the analysis result obtained in the processing of Step S220 (Step S222).

FIGS. 9 to 14 are diagrams for explaining an information processing method according to the second embodiment. In a manner similar to the first embodiment, an example of analyzing the communication in which the participant A, the participant B, and the participant C participate will be described with reference to FIGS. 9 to 14.

Figure 9:
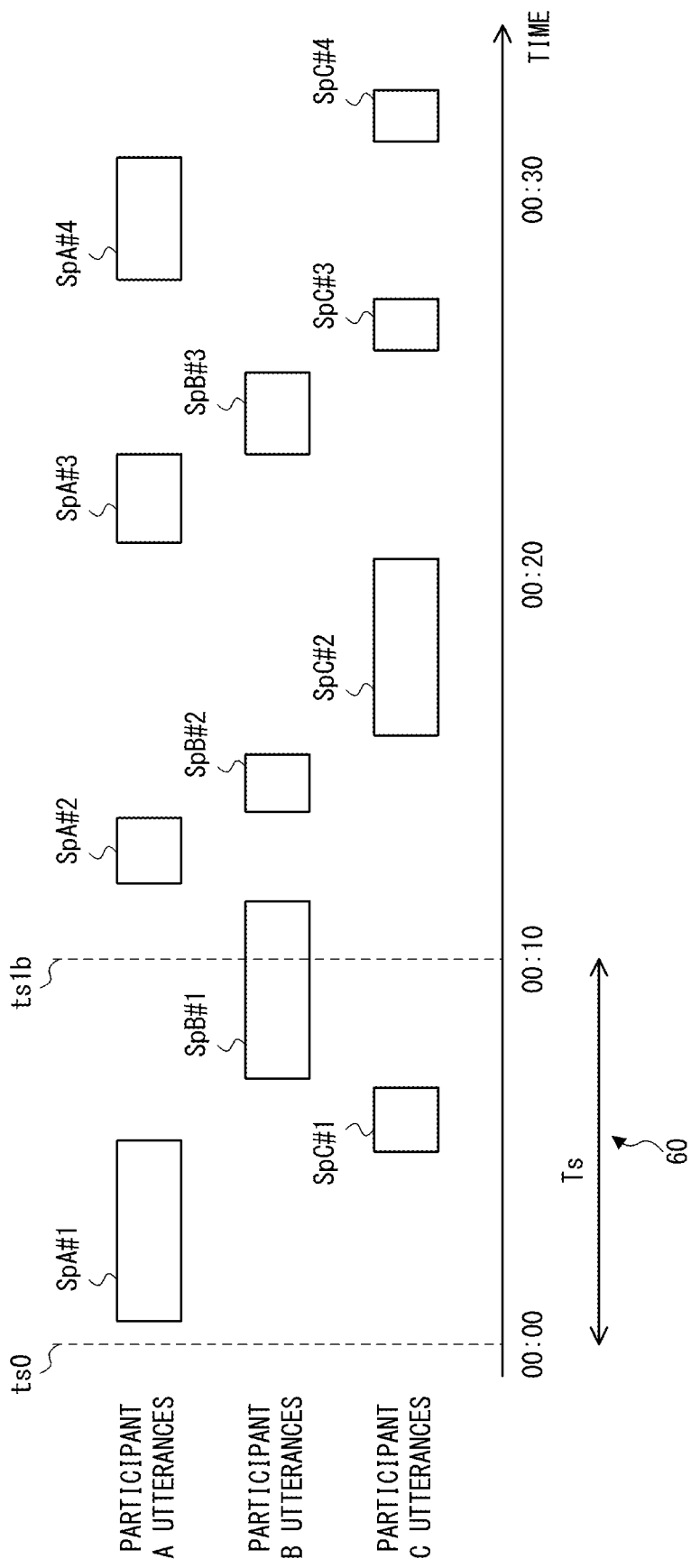
FIG. 9 is a diagram for explaining the information processing method according to the second embodiment.

FIG. 9 is a diagram for explaining the processing (the first step) of Step S206 according to the second embodiment. The reference analysis section setting unit 122 arranges the first reference analysis section boundary ts1b at a time point Ts minutes from the start time point ts0 of the communication (S206). Note that as described above, Ts is the time length of the reference analysis section 60. Further, Ts1b may be the same as Ts1 according to the first embodiment.

Figure 10:
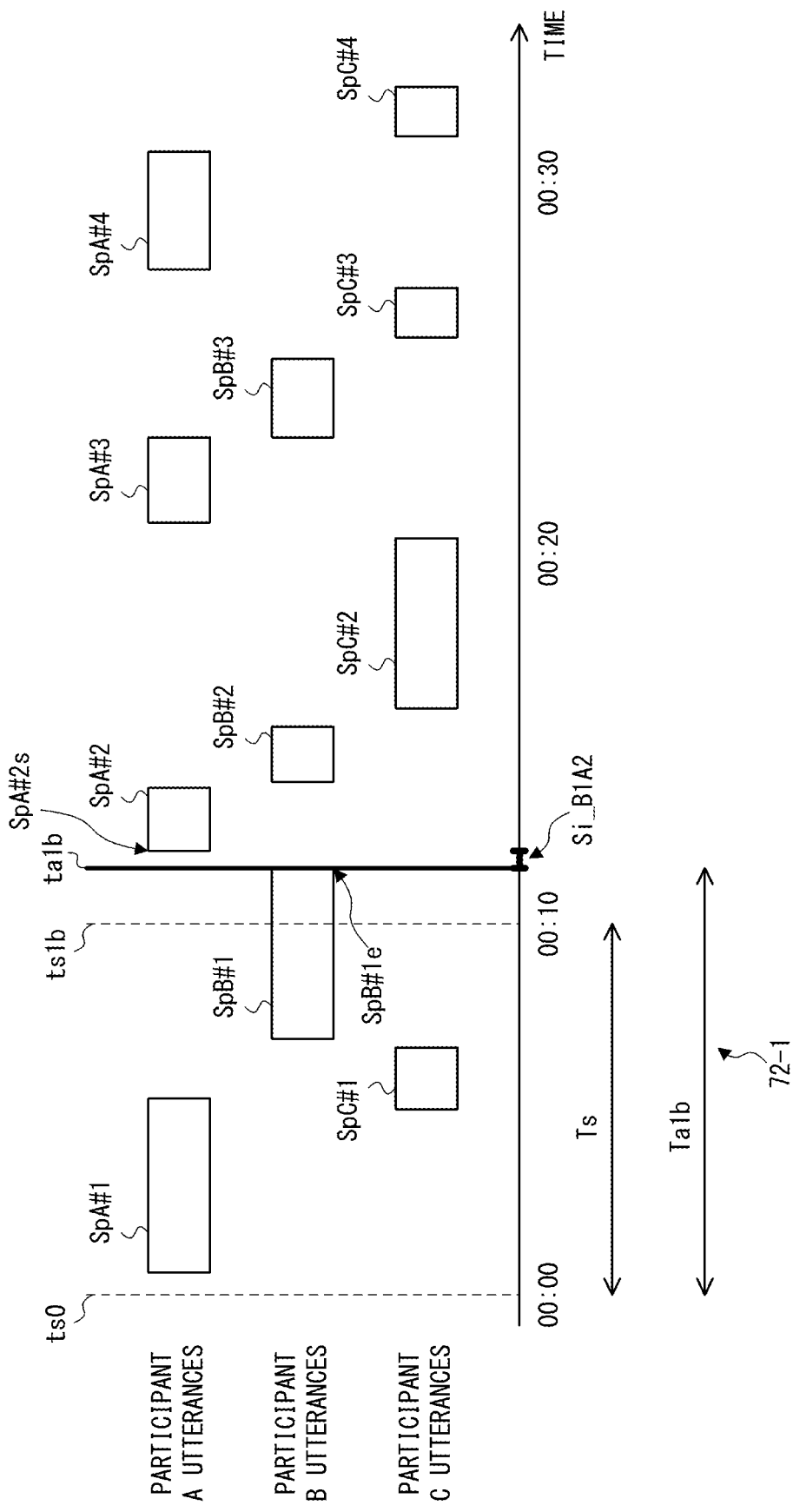
FIG. 10 is a diagram for explaining the information processing method according to the second embodiment.

FIG. 10 is a diagram for explaining the processing (the second step) of Step S208 according to the second embodiment. FIG. 10 shows an example of a method for setting the first actual analysis section. FIG. 10 corresponds to the case in which the first reference analysis section boundary ts1b is disposed in the utterance transition graph as shown in FIG. 9. In FIG. 10, the first reference analysis section boundary ts1b is included in the utterance section SpB #1. In this case, the actual analysis section setting unit 124 sets a time point included in the non-utterance time Si_B1A2, which is the non-utterance time closest to the reference analysis section boundary ts1b, as a time point of the first actual analysis section boundary ta1b. In this manner, the actual analysis section setting unit 124 sets the first actual analysis section 72-1 having the time length Ta1b (minutes), from the start time point ts0 of the communication to the first actual analysis section boundary ta1b. Note that Ta1b may be the same as Ta1 according to the first embodiment.

Figure 11:
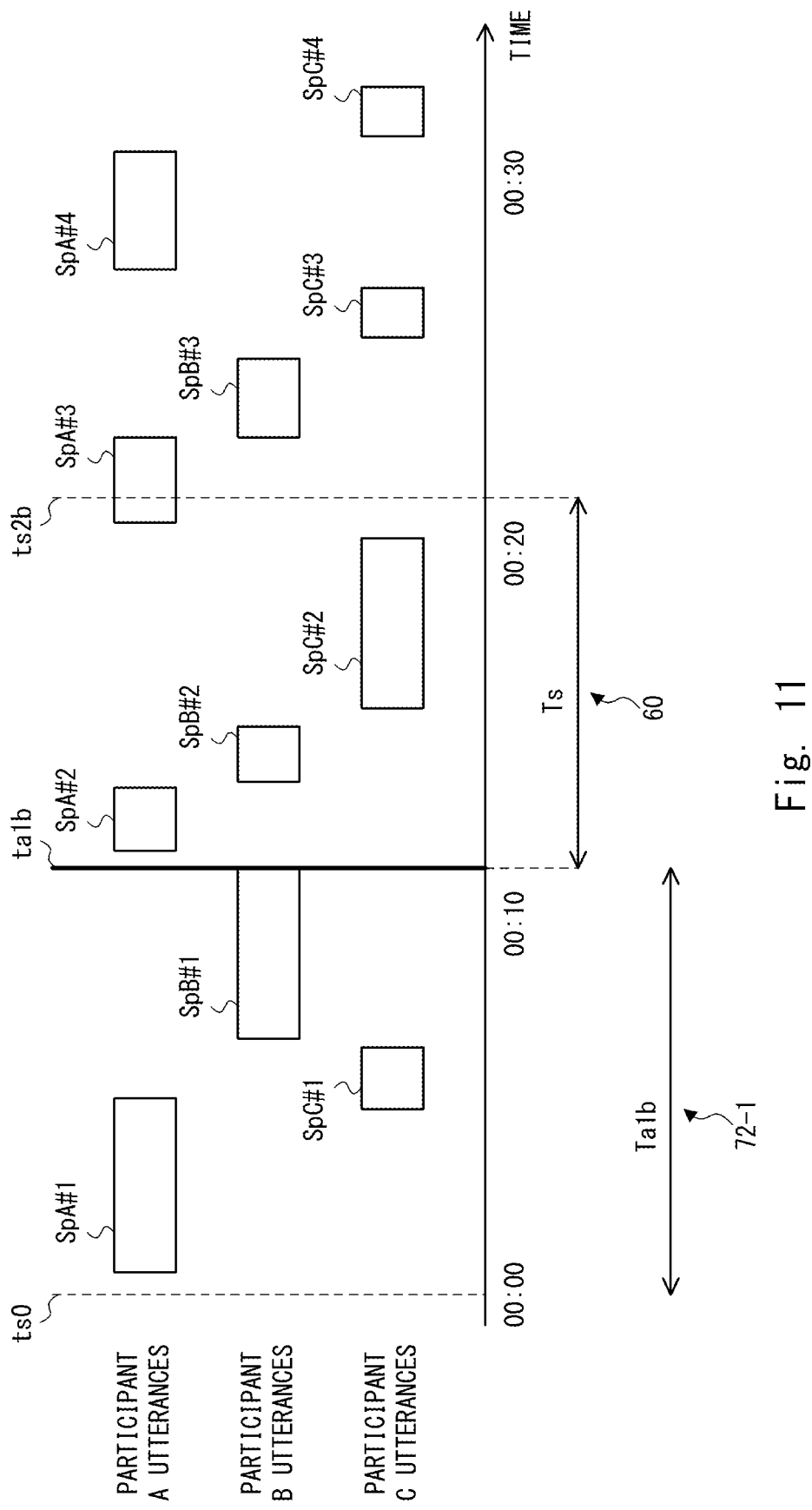
FIG. 11 is a diagram for explaining the information processing method according to the second embodiment.

FIG. 11 is a diagram for explaining the processing (the third step) of Step S210 according to the second embodiment. FIG. 11 corresponds to the case in which the first actual analysis section boundary ta1b is disposed in the utterance transition graph as shown in FIG. 10. The reference analysis section setting unit 122 disposes the second reference analysis section boundary ts2b at a time point Ts minutes, which is the time length Ts of the reference analysis section 60, from the first actual analysis section boundary ta1b. In the example of FIG. 11, since the time point corresponding to the reference analysis section boundary ts2b does not exceed the end time point of the communication, the processing proceeds to S208.

Figure 12:
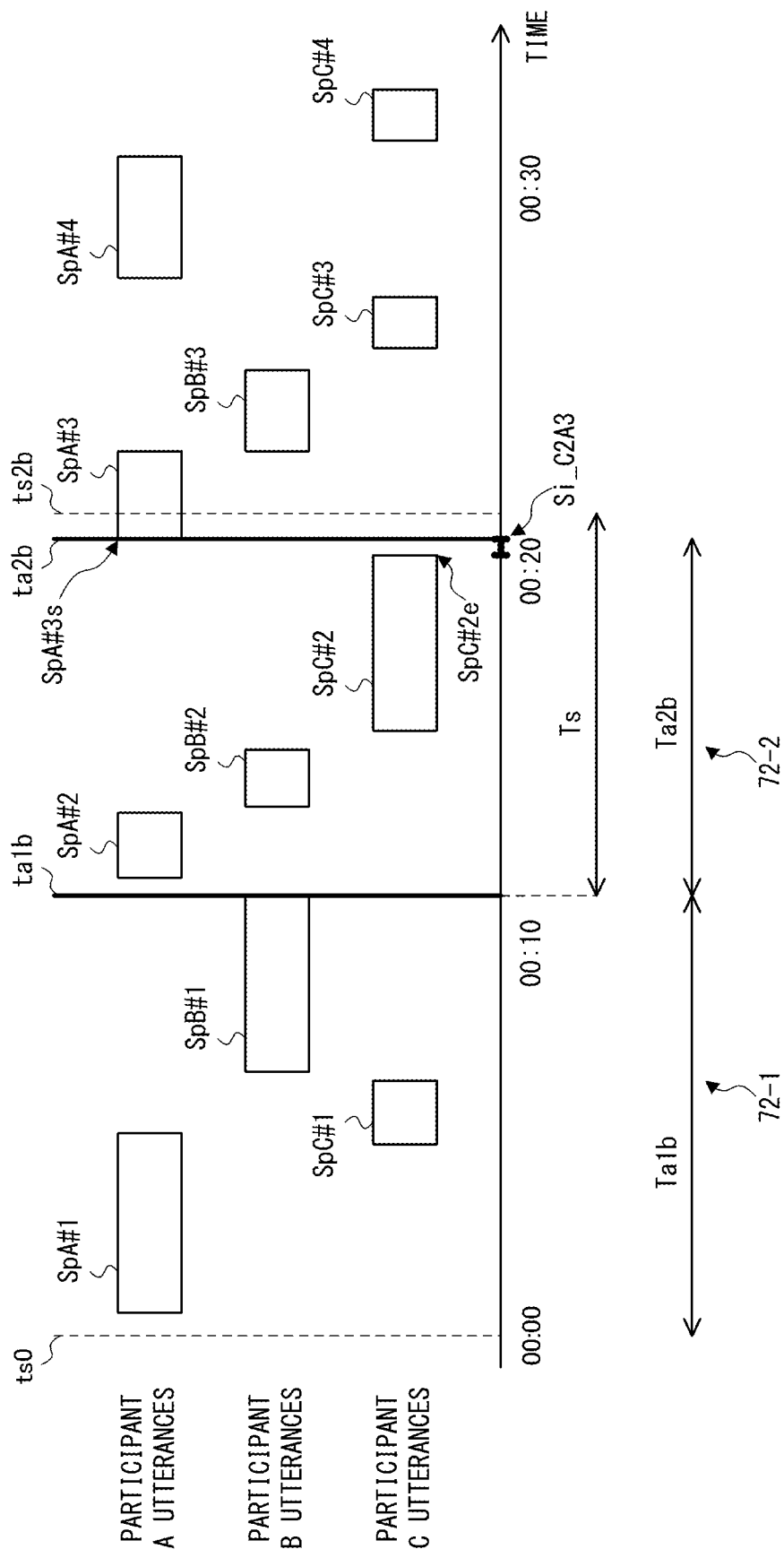
FIG. 12 is a diagram for explaining the information processing method according to the second embodiment.

FIG. 12 is a diagram for explaining the processing (the second step) of Step S208 according to the second embodiment. FIG. 12 shows an example of a method for setting the second actual analysis section. FIG. 12 corresponds to the case in which the second reference analysis section boundary ts2b is disposed in the utterance transition graph as shown in FIG. 11. In FIG. 12, the second reference analysis section boundary ts2b is included in the utterance section SpA #3. In this case, the actual analysis section setting unit 124 sets a time point included in the non-utterance time Si_C2A3, which is the non-utterance time closest to the reference analysis section boundary ts2b, as a time point of the second actual analysis section boundary ta2b. In this manner, the actual analysis section setting unit 124 sets the second actual analysis section 72-2 having the time length Ta2b (minutes), from the first actual analysis section boundary ta1b to the second actual analysis section boundary ta2b. Note that in FIG. 12, since the actual analysis section boundary ta2b corresponds to a start time point SpA #3s of the utterance section SpA #3, Ta2b may be different from Ta2 according to the first embodiment.

Figure 13:
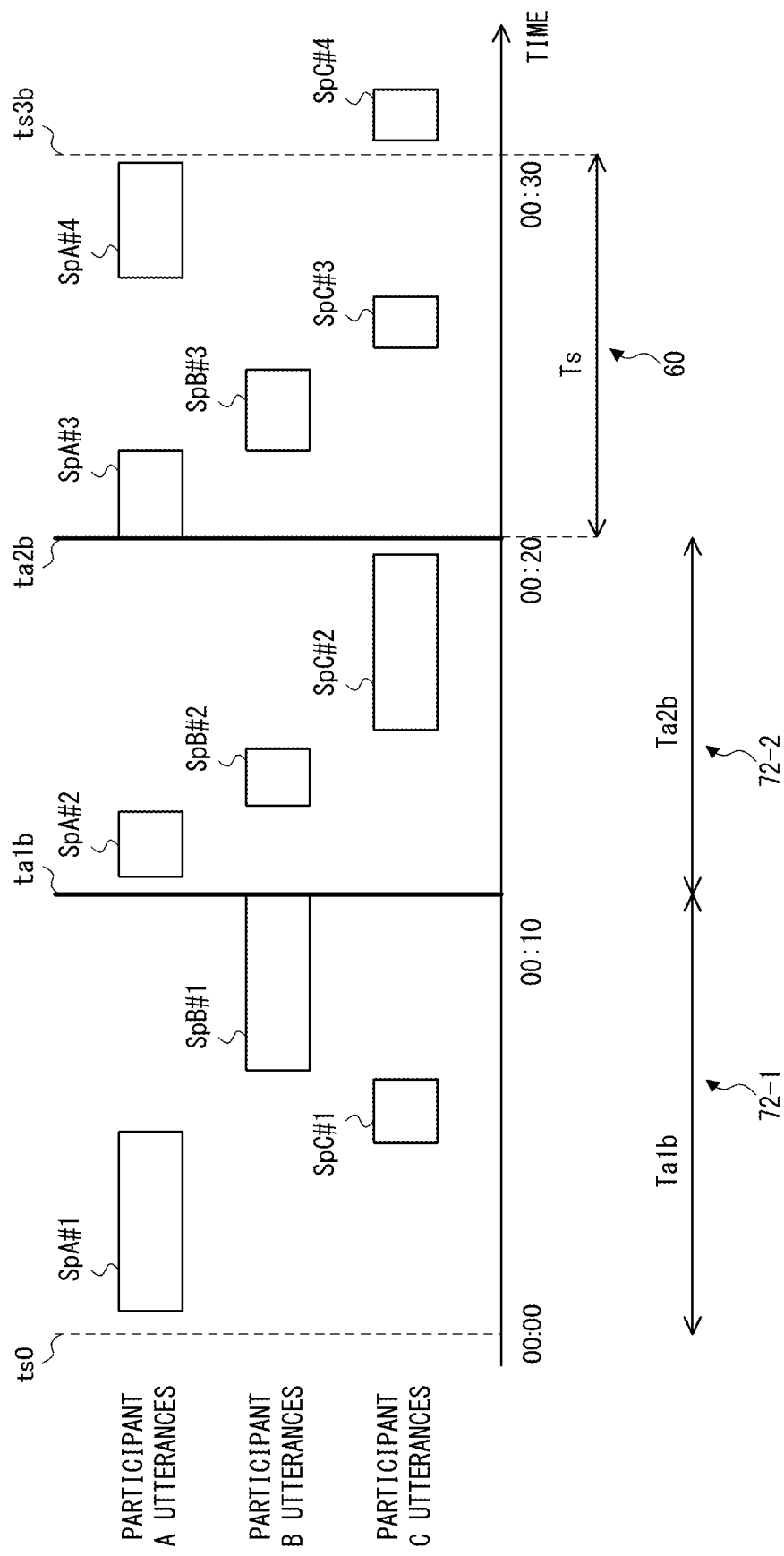
FIG. 13 is a diagram for explaining the information processing method according to the second embodiment.

FIG. 13 is a diagram for explaining the processing (third step) of Step S210 according to the second embodiment. FIG. 13 corresponds to the case in which the second actual analysis section boundary ta2b is disposed in the utterance transition graph as shown in FIG. 12. The reference analysis section setting unit 122 disposes the third reference analysis section boundary ts3b at a time point Ts minutes, which is the time length Ts of the reference analysis section 60, from the second actual analysis section boundary ta2b. In the example of FIG. 13, since the time point corresponding to the reference analysis section boundary ts3b does not exceed the end time point of the communication, the processing proceeds to S208.

Figure 14:
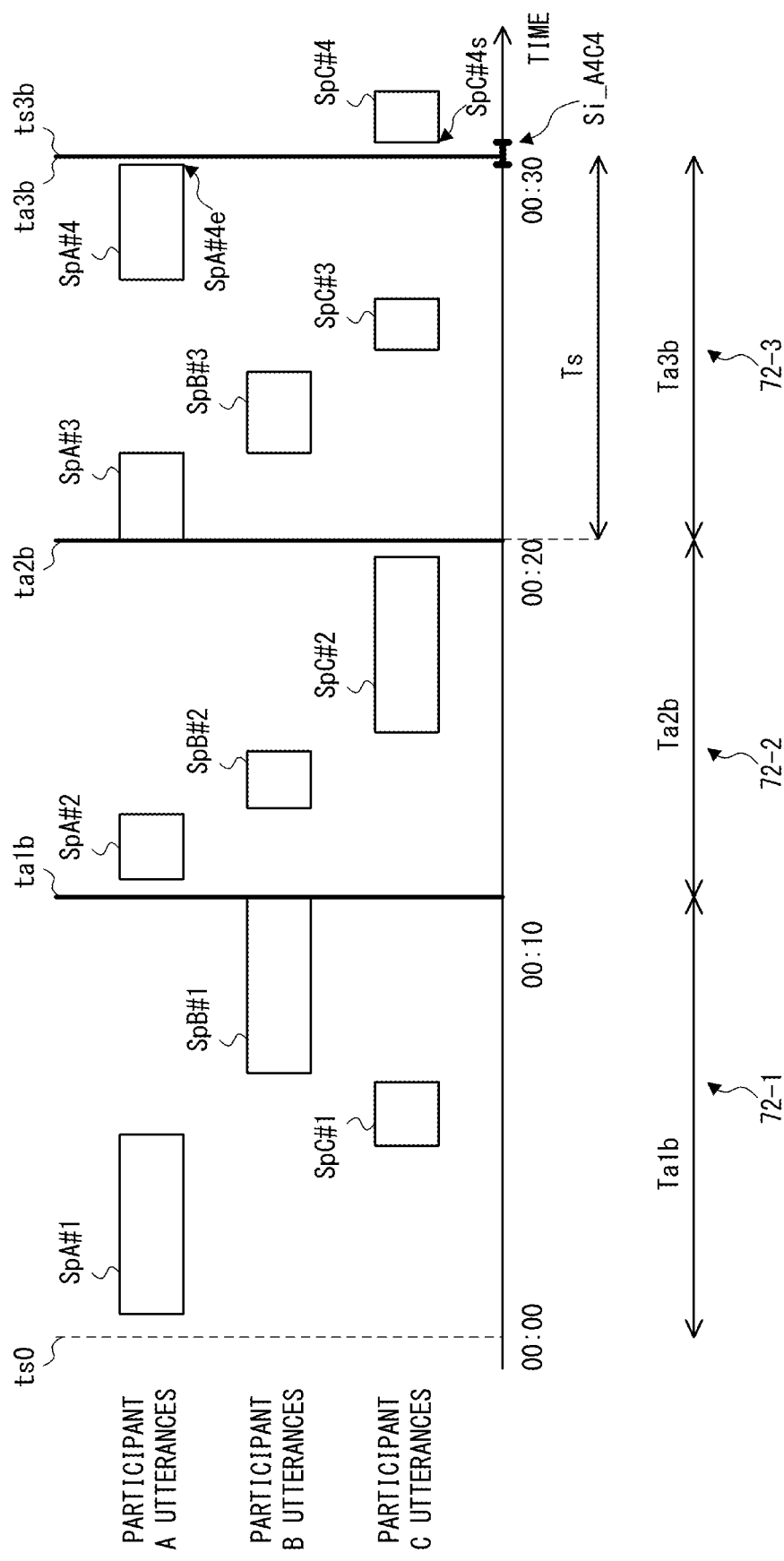
FIG. 14 is a diagram for explaining the information processing method according to the second embodiment.

FIG. 14 is a diagram for explaining the processing (the second step) of Step S208 according to the second embodiment. FIG. 14 shows an example of a method for setting the third actual analysis section. FIG. 14 corresponds to the case in which the third reference analysis section boundary ts3b is disposed in the utterance transition graph as shown in FIG. 13. In FIG. 14, the third reference analysis section boundary ts3b is not included in any utterance section, but is included in the non-utterance time Si_A4C4. In this case, the actual analysis section setting unit 124 sets, as it is, the time point of the reference analysis section boundary ts3b as the time point of the third actual analysis section boundary ta3b. In this manner, the actual analysis section setting unit 124 sets the third actual analysis section 72-3 having the time length Ta3b (minutes), from the second actual analysis section boundary ta2b to the third actual analysis section boundary ta3b. Note that Ta3b may be different from Ta3 according to the first embodiment.

The information processing apparatus 100 according to the second embodiment is configured to set the boundaries of the reference analysis sections, and to set the boundaries of the actual analysis sections using the set boundaries of the reference analysis sections so that the time points of the boundaries of the actual analysis sections become the times corresponding to the non-utterance times, sequentially from the start time point of the communication. With such a configuration, the length of the actual analysis section can be made closer to the length of the reference analysis section as compared with the method according to the first embodiment.

That is, the information processing apparatus 100 according to the first embodiment is configured to collectively set the plurality of reference analysis section boundaries. When the actual analysis section boundaries are set using the reference analysis section boundaries set by such a method, the difference between the length of each actual analysis section and the length of the reference analysis section may become large. For example, focusing on the nth actual analysis section boundary, in the first embodiment, the length of the nth actual analysis section is affected not only by the relationship between the nth reference analysis section boundary and the non-utterance time but also by the relationship between the (n−1)th reference analysis section boundary and the non-utterance time. For this reason, in the case of the first embodiment, the difference between the length of each actual analysis section and the length of the reference analysis section may become large.

On the other hand, the information processing apparatus 100 according to the second embodiment sets the time point of the (n+1)th reference analysis section boundary at a time point after the nth actual analysis section boundary by the length of the reference analysis section. Then, the information processing apparatus 100 according to the second embodiment sets the (n+1)th actual analysis section boundary at the time point of the non-utterance time close to the set reference analysis section boundary. By doing so, each time one actual analysis section boundary is set, the setting can be performed in accordance with the length of the reference analysis section, so that the difference between the length of each actual analysis section and the length of the reference analysis section can be reduced. For example, focusing on the nth actual analysis section boundary, in the second embodiment, the length of the nth actual analysis section is affected by the relationship between the nth reference analysis section boundary and the non-utterance time. Therefore, in the second embodiment, as compared with the first embodiment, the difference between the length of each actual analysis section and the length of the reference analysis section can be minimized or reduced.

The information processing apparatus 100 according to the second embodiment is configured to execute the first step, the second step, the third step, and repeat the second step and the third step to set the respective time points of the boundaries of the plurality of actual analysis sections. With such a configuration, it is possible to more reliably set the boundaries of the plurality of actual analysis sections sequentially.

Modified Example

Note that the present disclosure is not limited to the embodiments described above, and may be appropriately modified without departing from the purpose thereof. For example, in the above flowchart, the order of the plurality of processes can be changed as appropriate. In the above flowchart, one of the plurality of processes may be omitted. For example, the processes of Steps S120 and S122 in FIG. 3 may be omitted. The same applies to FIG. 8.

Further, each of the components shown in FIG. 2 is not limited to being physically implemented by one apparatus. For example, the analysis unit 132 and the analysis result output unit 134 may be implemented by apparatuses other than the apparatus implementing the components shown in FIG. 2. Each of the components shown in FIG. 2 may also be implemented by cloud computing.

In the above embodiments, the utterances are collected by the sound collection apparatuses 10 to generate the sound pressure data, and the utterance section of each participant is judged from the sound pressure data. However, the present disclosure is not limited to such a configuration. Specifically, utterances need not be detected by a microphone (sensor). For example, the participant himself or herself or another worker may input the time when he or she uttered, using a counter or the like. For example, the utterance section may be judged by pressing a utterance start button of the counter at the timing when a certain participant utters, and pressing an utterance end button of the counter at the timing when the utterance ends. In other words, when the utterance judgement unit 114 judges the utterance section, it is not limited to using the utterance data acquired by the sound collection apparatuses 10.

In the above program the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM, CD-R (compact disc recordable), CD-R/W, and semiconductor memories (such as mask ROM, PROM (Programmable ROM), EPROM (Erasable PROM), flash ROM, RAM, etc.). Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing method for supporting analysis of communication, the information processing method comprising:
    judging an utterance period by determining noise in voice data using sound pressure data sensed by a sensor and relative to a predetermined threshold, the utterance period being a period on a time series of an utterance of each of a plurality of participants in communication, the plurality of participants participating in the communication;
    setting, for the communication, a boundary of a reference analysis periods each of which has a predetermined same time length that is determined according to an analysis method for communication, and when the set boundary of the reference analysis period is included in at least one of the utterance periods of the plurality of participants, setting a time point included in a non-utterance time closest to the boundary of the reference analysis periods as a time point of a boundary of actual analysis periods, and setting a boundary of the plurality of actual analysis periods in such a way that a length of the actual analysis period becomes as close as possible to the length of the reference analysis period, the actual analysis period being a time period for actually analyzing the communication, and the non-utterance time being a time not belonging to any of the utterance periods of the plurality of participants; and
    analyzing the utterances of the plurality of participants for each of the plurality of set actual analysis periods.

2. The information processing method according to claim 1, further comprising:
    setting the boundaries of the plurality of the reference analysis periods in advance from a start time point to an end time point of the communication at intervals corresponding to the reference analysis periods, and setting the boundaries of the plurality of reference analysis periods using the set boundaries of the plurality of reference analysis periods so that the time point of the boundary of the plurality of actual analysis periods becomes a time corresponding to the non-utterance time.

3. The information processing method according to claim 1, further comprising:
    setting the boundary of the reference analysis periods, and setting the boundary of the actual analysis periods using the set boundary of the reference analysis periods so that the time point of the boundary of the actual analysis periods becomes the time corresponding to the non-utterance time, sequentially from a start time point of the communication.

4. The information processing method according to claim 3, further comprising:
    executing a first step of setting the boundary of the reference analysis periods after a time corresponding to the reference analysis periods from the start time point of the communication;
    executing a second step of setting the boundary of the actual analysis periods using the set boundary of the reference analysis periods so that the time point of the boundary of the actual analysis periods becomes the time corresponding to the non-utterance time;
    executing a third step of setting the boundary of the reference analysis periods after the time corresponding to the reference analysis periods from the time point of the set boundary of the actual analysis periods; and
    repeating the second step and the third step, so that the time points of the boundaries of the plurality of actual analysis periods are set.

5. An information processing system or supporting analysis of communication, the information processing system comprising a processor configured to:
    judge an utterance period by determining noise in voice data using sound pressure data sensed by a sensor and relative to a predetermined threshold, the utterance period being a period on a time series of an utterance of each of a plurality of participants in communication, the plurality of participants participating in the communication; and
    set, for the communication, a boundary of a reference analysis periods each of which has a predetermined same time length that is determined according to an analysis method for communication, and when the set boundary of the reference analysis period is included in at least one of the utterance periods of the plurality of participants, set a time point included in a non-utterance time closest to the boundary of the reference analysis periods as a time point of a boundary of actual analysis periods, and set a boundary of the plurality of actual analysis periods in such a way that a length of the actual analysis period becomes as close as possible to the length of the reference analysis period, the actual analysis period being a time period for actually analyzing the communication, and the non-utterance time being a time not belonging to any of the utterance periods of the plurality of participants; and
    analyze the utterances of the plurality of participants for each of the plurality of set actual analysis periods.

6. A non-transitory computer readable medium storing a program for supporting analysis of communication, the program causing a computer to execute:
    judging an utterance period by determining noise in voice data using sound pressure data sensed by a sensor and relative to a predetermined threshold, the utterance period being a period on a time series of an utterance of each of a plurality of participants in communication, the plurality of participants participating in the communication;
    setting, for the communication, a boundary of a reference analysis periods each of which has a predetermined same time length that is determined according to an analysis method for communication, and when the set boundary of the reference analysis period is included in at least one of the utterance periods of the plurality of participants, setting a time point included in a non-utterance time closest to the boundary of the reference analysis periods as a time point of a boundary of actual analysis periods, and setting a boundary of the plurality of actual analysis periods in such a way that a length of the actual analysis period becomes as close as possible to the length of the reference analysis period, the actual analysis period being a time period for actually analyzing the communication, and the non-utterance time being a time not belonging to any of the utterance periods of the plurality of participants; and analyzing the utterances of the plurality of participants for each of the plurality of set actual analysis periods.

* * * * *